(12) United States Patent
Baudry et al.

(10) Patent No.: US 11,318,707 B2
(45) Date of Patent: May 3, 2022

(54) EXTERIOR VEHICLE TRIM PART

(71) Applicant: AUTONEUM MANAGEMENT AG, Winterthur (CH)

(72) Inventors: Fabien Baudry, Saint Georges sur Eure (FR); Bertrand Delmas, Winterthur (CH)

(73) Assignee: AUTONEUM MANAGEMENT AG, Winterthur (CH)

( * ) Notice: Subject to any disclaimer, the term of this patent is extended or adjusted under 35 U.S.C. 154(b) by 1214 days.

(21) Appl. No.: 15/571,793

(22) PCT Filed: Apr. 27, 2016

(86) PCT No.: PCT/EP2016/059427
§ 371 (c)(1),
(2) Date: Nov. 3, 2017

(87) PCT Pub. No.: WO2016/177618
PCT Pub. Date: Nov. 10, 2016

(65) Prior Publication Data
US 2019/0118506 A1  Apr. 25, 2019

(30) Foreign Application Priority Data
May 6, 2015  (EP) .................................... 15166673

(51) Int. Cl.
*B32B 5/24* (2006.01)
*B32B 5/02* (2006.01)
(Continued)

(52) U.S. Cl.
CPC .............. *B32B 5/245* (2013.01); *B32B 5/022* (2013.01); *B32B 5/08* (2013.01); *B32B 5/18* (2013.01); *B32B 5/26* (2013.01); *B32B 7/10* (2013.01); *B32B 7/12* (2013.01); *B32B 27/12* (2013.01); *B32B 27/40* (2013.01); *B62D 35/02* (2013.01); *B32B 2255/02* (2013.01);
(Continued)

(58) Field of Classification Search
None
See application file for complete search history.

(56) References Cited

U.S. PATENT DOCUMENTS 4,330,494 A * 5/1982 Iwata .................... B29C 44/186
264/46.2
5,251,414 A   10/1993 Duke
(Continued)

FOREIGN PATENT DOCUMENTS

EP   2631066 A1   8/2013

OTHER PUBLICATIONS https://patents.google.com/patent/JPH0375129A/en?oq=JP03-75129 (Year: 1989).*
(Continued)

*Primary Examiner* — Arti Singh-Pandey
(74) *Attorney, Agent, or Firm* — FisherBroyles, LLP; Craig W. Mueller

(57) ABSTRACT

An exterior structural trim part for a vehicle, comprising at least an area comprising at least 3 layers superposed and laminated together to form a structural unit whereby the two outer layers are compressed and consolidated fibrous layers and with an inner layer situated in-between the two fibrous outer layers being an impervious polyester foam layer.

20 Claims, 2 Drawing Sheets

(51) Int. Cl.

| | |
|---|---|
| *B32B 5/18* | (2006.01) |
| *B32B 7/12* | (2006.01) |
| *B62D 35/02* | (2006.01) |
| *B32B 27/12* | (2006.01) |
| *B32B 5/08* | (2006.01) |
| *B32B 5/26* | (2006.01) |
| *B32B 7/10* | (2006.01) |
| *B32B 27/40* | (2006.01) |
| *B60R 13/08* | (2006.01) |
| *G10K 11/168* | (2006.01) |

(52) U.S. Cl.
CPC ... *B32B 2260/023* (2013.01); *B32B 2260/046* (2013.01); *B32B 2262/0276* (2013.01); *B32B 2262/0284* (2013.01); *B32B 2262/12* (2013.01); *B32B 2266/0264* (2013.01); *B32B 2266/08* (2013.01); *B32B 2305/022* (2013.01); *B32B 2307/544* (2013.01); *B32B 2307/546* (2013.01); *B32B 2307/7242* (2013.01); *B32B 2307/7265* (2013.01); *B32B 2605/08* (2013.01); *B60R 13/0861* (2013.01); *G10K 11/168* (2013.01); *Y02T 10/82* (2013.01); *Y02T 10/88* (2013.01); *Y10T 442/647* (2015.04); *Y10T 442/651* (2015.04); *Y10T 442/666* (2015.04); *Y10T 442/674* (2015.04); *Y10T 442/682* (2015.04)

(56) References Cited

U.S. PATENT DOCUMENTS

| | | | |
|---|---|---|---|
| 2005/0042432 A1* | 2/2005 | Jones | B32B 27/36 428/292.1 |
| 2005/0042433 A1* | 2/2005 | Jones | B32B 27/00 428/292.1 |
| 2009/0270524 A1* | 10/2009 | Oka | C08L 23/02 521/138 |
| 2013/0207413 A1* | 8/2013 | Lookebill | B32B 5/022 296/182.1 |
| 2017/0043815 A1* | 2/2017 | Baudry | B32B 27/12 |
| 2017/0050682 A1* | 2/2017 | Baudry | B32B 27/12 |
| 2019/0259365 A1* | 8/2019 | Scheinhardt | B32B 25/08 |
| 2020/0139667 A1* | 5/2020 | Menozzi | D04H 3/147 |

OTHER PUBLICATIONS https://patents.google.com/patent/EP1670639B1/en?oq=WO+2005025858 this is the link for EP 1670639B1 (Year: 2003).*
https://patents.google.com/patent/JP2014514185A/en?oq=JP+2014514185 (Year: 2011).*
https://patents.google.com/patent/JP2014159219A/en?oq=JP2014-159219 (Year: 2013).*
ISR/WO from PCT application PCT/EP2016/059427, Apr. 27, 2016.

* cited by examiner

EXTERIOR VEHICLE TRIM PART

TECHNICAL FIELD

The present invention is directed to an exterior vehicle trim part, particularly an under engine shield or an under body panel and a method of producing it.

BACKGROUND

It is known in the art to use vehicle exterior trim parts, in particular under-body trim parts and/or under engine shields. Exterior trim parts, also called cladding, are formed as 3-dimensional structural parts. Exterior trim parts are defined as trim parts or cladding used to cover (part of the) surface of the underside of the vehicle. This can be for instance the area underneath the engine bay, the main area under the passenger compartment, as well as the area under the trunk. All areas are exterior and may be facing with a surface area directly to the road. These type of under-body trim parts may improve the aerodynamics of the vehicle, may reduce the fuel consumption and/or may protect the under body of the vehicle.

These exterior trim parts need to be structural in the sense of being able to mostly keep their shape when mounted under the car, without showing too much deflection, in particular sagging, during use and/or over the lifetime of the car. Therefore, depending on the car type, these exterior trim parts are preferably able to span a larger distance or area without unacceptable sagging or deflection. A lack of structural stiffness might be compensated with the number of mounting points to mount the trim part to the vehicle, in most of the cases these mounting points are arranged around the rim of the exterior trim parts and not necessary across the middle of the structure. An increase of mounting points including means for mounting will add to the overall cost and weight of a part and will increase complexity of production and mounting.

The structural stiffness can be impaired by the harsh conditions these exterior trim parts meet during their lifetime of use on the vehicle. They can be subjected to stone chipping, dirt, hot, cold and/or wet weather conditions and might also collide with obstacles underneath the car during use. Furthermore the areas close to the power train might be exposed to a high thermal load.

Known exterior trim parts may be made of either solid plastic, in the form of injection moulded parts or alternatively made of combination of a core material and covering layers containing glass fibres, where the structural stiffness is mainly coming from the glass fibres. Glass fibres are less popular in recent years as exposure to the fibres during the production of the parts, as well as the assembly of the parts in the car, can pose a health issue for the people handling the material. In general these technologies result in heavy parts and there is a need for lighter solutions.

Honeycomb core layers of various materials are known but poor adhesion between the honeycomb core and the face layers is a problem since the bonding contact area between the core and face layer is very small.

Many of these exterior trim parts need to be moulded with ribs and/or embossments in order to have the required stiffness. These having the disadvantage of possibly reduce the aerodynamic benefits of the trim part and/or increasing the space required underneath the vehicle.

The higher potential for liquid absorption and retention, in particular of dirty road water, oils and other liquids, is a more general problem with under body trim parts containing or consisting of porous materials, like honeycomb core, air permeable and open cell core materials. This could increase the weight of the trim part and/or might cause failure of the mounting and/or deflection of the material during use of the trim part on the vehicle.

There is a need for alternative materials and lightweight solutions with high stiffness for exterior trim parts, in particular under engine shields and under body panels, which are at least able to perform comparable to the current products on the market fulfilling the requirements of the car makers for these products such as good fatigue properties and good recyclability and that overcome the problems of the current materials, in particular the drawback of fluid absorption and retention.

SUMMARY OF INVENTION

The object is achieved by the exterior trim part or cladding for a vehicle according to claim 1.

In a first embodiment of the invention the exterior structural trim part for a vehicle, comprises at least an area comprising at least 3 layers superposed and laminated together to form a structural unit whereby the two outer layers are compressed and consolidated fibrous layers and whereby the inner layer situated in-between the two fibrous outer layers is an impervious polyester foam layer.

The combination of compressed and consolidated fibrous layers together with the polyester foam layer increases the overall structural stiffness of the trim part. Surprisingly also the liquid absorption and retention can be reduced thanks to the impervious foam and the compressed fibrous layers.

Polyester foam is closed cell foam that is impervious and will, due to these properties, hardly absorb liquid and or retain it. However not only is it preventing liquid to enter into the foam, it also enables, due to a high enough compression stiffness, more compacted fibrous covering layer during the moulding process, thereby reducing also the liquid absorption and retention for these layers.

The impervious polyester foam core layer has a compression modulus, measured according to ISO 844, of at least about 30 MPa, preferable minimum of 55 MPa. The high compression stiffness of the polyester foam is not only allowing the fibrous layers to be more compressed during the moulding process as mentioned above, but also contributing to the stiffness of the structural unit and the trim part. The high compression stiffness of the foam is preventing buckling of the compressed fibrous layers during bending. Buckling of the face layers may cause delamination and cracks that might lead to the exterior trim part breaking. A further advantage is that the polyester foam is not brittle like many other types of foam, including some types of PUR foam. Brittle foam might not have enough strength and fatigue properties.

Polyester foam has also an advantage, compared to for example solid plastic parts, that it is damping the trim part better. This is especially advantageously when the trim part is impacted by a large object such as a stone or similar. The trim part can then better absorb the energy and avoid damage to the vehicle or its components.

The Flexural Modulus of the structural unit described here has preferably a minimum modulus of 200 MPa in the regions with the at least 3 layer structural unit, preferable minimum of 300 MPa.

Polyester foam according to the invention as claimed is based on thermoplastic polyester resin and preferably made of a foam-able grade of semi crystalline polyethylene terephthalate (PET). As they are melt extruded with a suitable chemical or physical blowing agent, these thermoplastic polyester resins yield closed-cell foams. The foam can be produced by recycled polyester or virgin raw material or a combination of both. Within the scope of the present invention polyester, in particularly polyethylene terephthalate, foam as claimed and disclosed is not including polyester based polyurethane (PUR) foam.

The impervious PET foam layer has a density of 60 to 200 Kg/m$^3$, preferably 75 to 120 Kg/m$^3$.

At least in areas of the trim part requiring a higher structural stiffness the structural unit according to the invention can be used. Preferably this area can be between 1 and 100%, preferably between 5 and 50% of the total surface area of the trim part. For example if there is a need for a local reinforcement of the trim part in those areas where one would apply a rib or embossment for instance, a small strip of foam can be placed between 2 layers of fibrous material forming the structural unit to create an increase in local stiffness. This may be as low as 1 or 2% of the total surface area of the trim part. The thickness and surface can be adjusted such that the foam is hardly visible after the forming of the part.

In case more than 1 or 2 ribs need to be replaced or the trim part needs to be stiffened over a large area and/or if a trim part with a flat surface is wanted, the structural unit might cover up to 100% of the surface area of the trim part. However preferably the PET foam edges are covered by the fibrous layers and the PET foam is not visible after the moulding. The area or surface area is defined as the area containing the structural unit divided by the total surface area of the trim part parallel to the vehicle surface covered.

Preferably the fibrous layers that are covering the PET foam are large enough to encase the foam and make a laminate seam along the foam area so that the foam is encapsulated entirely in the fibrous material, like an inlay. One of the fibrous layers might not cover the full area of the exterior trim part, but is preferable large enough to cover the PET foam as described above.

The fibrous material moulded and consolidated might already form a structural layer with enough stiffness for the remaining areas.

The areas that may require a higher stiffness can for instance be the area spanning the largest distance between mounting points. By increasing the stiffness of the trim part, the number of mounting points can be reduced, which is reducing complexity and cost.

If the area with the structural unit is covering a large area, the exterior structural trim part might have a flat even area towards the road surface, without embossments or thickness changes. Such flat even exterior trim part will improve the aerodynamics of the trim part and vehicle, compared to other solutions available on the market where ribs and/or embossments might be required in order to get enough stiffness of the trim part.

The area of the trim part not containing the structural unit comprises at least one of the outer fibrous layers compressed and consolidated.

The fibrous layers of the trim part, according to the invention, consists of a consolidated fibrous material consisting of filler fibres and a binder in the form of a thermoplastic binder, whereby the binder forms small binding points between the fibers to consolidate the fibrous material.

The filler fibers preferably are at least one of thermoplastic fibers, preferably polyester fibers, preferably polyethylene-terephthalate (PET) or polybutylene terephthalate (PBT), or a mixture of such fibers.

The thermoplastic binder is one of a copolymer of polyester or a polyamide, preferably polyamide-6 or polyamide-66. The thermoplastic binder can be in the form of fibers, powder or flakes. The amount of the thermoplastic binder can be such that the PET foam and adjacent fibrous layers are laminated together without an additional adhesion or glue layer.

In a preferred solution the filler fibers and the binder are combined in a bicomponent or conjugate fiber or filament, preferably of the core-sheath type, with a core or filler component consisting of polyester, preferably polyethylene terephthalate (PET), and the sheath or binder component consisting of a copolymer of polyester, preferably CoPET, or a polyamide, preferably polyamide-6 or -66. The consolidated fibrous layer is consisting of filler fibers formed by the core or filler component and the binder formed by the sheath or binder component and whereby the binder forms small binding points between the filler fibers to consolidate the fibrous layer. Advantageously, it will also bind/laminate the adjacent PET foam layer without the need for an additional glue or adhesion layer.

Preferably the fibrous layer is either a mixture of filler fibers and binder, preferably in the form of fibers, flakes or powder, whereby the binder is up to 50%, preferably up to 35% of the total weight of the fibrous layer, for example polyester fibers with 35% CoPolyester or polyamide binder or 100% bicomponent fibrous layer with up 30% of sheath binder material.

Preferably the fibrous layer is having up to 100% bicomponent fibers or filament. Eventually it can be mixed with other filling fibers for instance recycled thermoplastic fibers, for instance shoddy material made of recycled synthetic fibers, or recycled polyester fibers.

The advantage of using preferably bicomponent filaments or fibers is that the sheath of all filaments or fibers are contributing to the adhesion between the PET foam and the compressed and consolidated fibrous layer, when the sheath of the fiber is, during moulding and lamination, melting and forming binding points between the fibers rendering in a more even and better lamination of the fibrous layer to the PET foam layer.

Any of the fibers in any of the embodiments of the invention may be staple fibres or endless filaments or a mixture of those.

The two fibrous layers might have the same or a different fibrous composition and/or mixture.

Preferably the PET foam layer after moulding and lamination has an approximate thickness of less than 15 mm, preferable less than 8 mm, preferable less than 6 mm. The PET foam layer after moulding and lamination may have an approximate thickness of at least 2 mm, preferable at least 3 mm, preferable at least 4 mm. The thickness might vary over the surface area of the structural unit. Thicker PET foam will increase the stiffness of the structural unit, but is increasing the cost and the space required. Thinner PET foam is reducing the weight and cost of the trim part but is also reducing the stiffness. A thicker smaller strip might have the same effect as a thinner larger strip or plate.

At least one of the compressed and consolidated fibrous layers in the area of the structural unit has an approximate thickness of less than 3 mm, preferable less than 1.5 mm. At least one of the compressed and consolidated fibrous layers in the area of the structural unit has an approximate thickness of at least 0.2 mm, preferable at least 0.5 mm.

At least one of the fibrous layers has an approximate area weight of less than 1500 g·m$^{-2}$ (gram per square meter), preferably less than 800 g·m$^{-2}$, and preferably less than 600 g·m$^{-2}$. At least one of the fibrous layers has an approximate area weight of at least 200 g·m$^{-2}$, preferable at least 300 g·m$^{-2}$.

The more compressed the fibrous layers are the more they contribute to the overall stiffness in the area of the structural unit and to the overall stiffness of the trim part.

The two fibrous layers might have the same or a different thickness and/or area weight.

In a further embodiment of the invention, the structural trim part can further comprise at least one additional layer, preferably, an optionally perforated, film layer, preferably made of thermoplastic polyurethane, or a nonwoven scrim layer, superposed and laminated to the outer surface of at least one of the outer consolidated fibrous layers, to further optimise the properties.

Preferably the PET foam is combined with polyester fibrous skins rendering in a mono material product. Such a product would be easy to recycle. For instance the material may be melted again and formed in PET resin to be reused for all types of PET products including the product according to the invention, or directly shredded into pieces that can be used as raw material for the same, similar or other products.

In a further embodiment of the invention, the structural trim part can further comprise at least partially a heat radiating layer, preferable a metal film, preferably aluminium, or coating on the outer surface of the trim part, facing a vehicle element that has an increased temperature during use of the car, for instance a hot source such as the engine or the exhaust pipe. Depending on the location of the exterior structural trim part it might be beneficial to at least partially add a heat radiating layer to the structural unit.

In a further embodiment of the invention the heat radiating layer is at least partially perforated.

The structural unit with the outer fibrous layers and the inner polyester foam layer can be used in a vehicle trim part like for instance as an under body trim part, for instance an under body panel, an under engine shield, a rear under body panel or an under centre panel. Due to the favourable thermal properties of the structural unit the trim part can also be used for components in the engine bay such as components for engine encapsulation or a bonnet liner.

Depending on the size, shape, number and position of the fixation points the overall stiffness of the exterior structural trim part can be optimized by placing one or more areas with the PET foam in-between the two fibrous layers where the size and position of these areas are defining the overall stiffness of the exterior trim part.

Within the scope of the present invention, Flexural Modulus is understood as a property of a body to be bent, indicating the body's curvature when a bending torque is imposed. Flexural Modulus [Mpa] is determined experimentally by a method according to ISO 178.

Within the scope of the present invention air impermeable or impervious, is defined as an air flow resistance equal to or above 8000 N·s·m$^{-3}$ for the sake of simplicity. The AFR is measured according to ISO 9053, using the direct airflow method (method A).

The trim part can be produced according to the standard production methods, preferably with at least a moulding step. The material may be heated in advance to the moulding or in the same step as the moulding to obtain the consolidation of the fibrous layer. During the moulding step the fibrous layer is compressed to form the more compressed outer fibrous layers.

The production may include at least the steps of:
Placing the layers to be moulded in the right order in the moulding tool;
Closing the moulding tool to form the shape of the trim part and heating the layers, for example by steam, in order to relax the polymers and melt the binder material thereby compressing and consolidating the fibrous layers and laminating them to the adjacent layers;
Opening the moulding tool thereby cooling the trim part and removing the finished trim part from the moulding tool.
Optionally in mould pinching—cutting of the rim of the trim part—can be integrated in the tool.
Optionally you can replace the one step heating and moulding by a preheating step and a cold moulding step.

BRIEF DESCRIPTION OF DRAWINGS

FIG. 1 shows a drawing of a vehicle from underneath with two non-exhaustive examples of possible locations of exterior trim parts according to the invention. The trim parts are mostly mounted parallel to the car floor facing the road. They are typically placed under the engine compartment (1) or passenger compartment (2).

FIG. 2 shows possible exterior trim parts, for instance under body panel (3), rear under body panel (4), engine under shield (5) and centre panel (6) according to the state of the art, that can be replaced with a trim part according to the invention including a structural unit. By using the material according to the invention ribs might be replaced by the structural unit and the surface can be flattened. Due to the higher stiffness the trim parts shown can also be combined together to form a larger trim part, even to form just one trim part covering the whole under body surface.

FIG. 3 is showing a top view of one example of an exterior trim part (7) with the structural unit (9) according to the invention. The structural unit (9) is partially covering an area of the trim part and the remaining area comprises at least of two fibrous layers (8). This large area of the structural unit is creating a flat area towards the road surface improving the aerodynamic behaviour of the vehicle compared to other solutions available on the market where ribs and/or embossments might be required in order to provide enough stiffness of the trim part.

The coverage percentage and location of the areas with the structural unit can be designed to optimise the overall stiffness and weight of the exterior trim part and or minimise the number of fixation points. FIG. 3 is showing the structural unit (9) as one large area with regular shape, but the structural unit area or areas can basically have any shape and or there might be two or more areas. The areas of the structural unit can cover a very small area of the trim part for example in the form of a small strip for local stiffening, one or more areas partially covering the trim part or up to basically covering the complete trim part. A-A' is indicating the cross section shown in FIG. 4.

FIG. 4 is showing cross section A-A' (10) of the trim part shown in FIG. 3. The trim part is formed by a first area having a structural unit (9), with a PET foam layer (11) laminated between two compressed and consolidated fibrous layers (12 and 13) and a second remaining area (8) with two compressed and consolidated fibrous layers (12 and 13) laminated together. The fibrous layers 12 and 13 are the continuing layers covering the entire surface of the trim part. The PET foam is mouldable and can be moulded to a smaller thickness, for example smaller than 2 mm, where at the edge of the PET foam layer the thickness of the foam is changing down to a very small thickness as shown on the picture, allowing for a smooth transition from the area with foam to the area without foam. Although the overall thickness of the main area of foam layer is favourably above 2 mm to achieve the overall structural stiffness needed, locally it might be that the foam is (further) compressed to a lower thickness, for instance at the border between the structural unit and the area without it, but also possible in areas following protrusions in the main vehicle body, or other areas with limited space.

Figure 1:
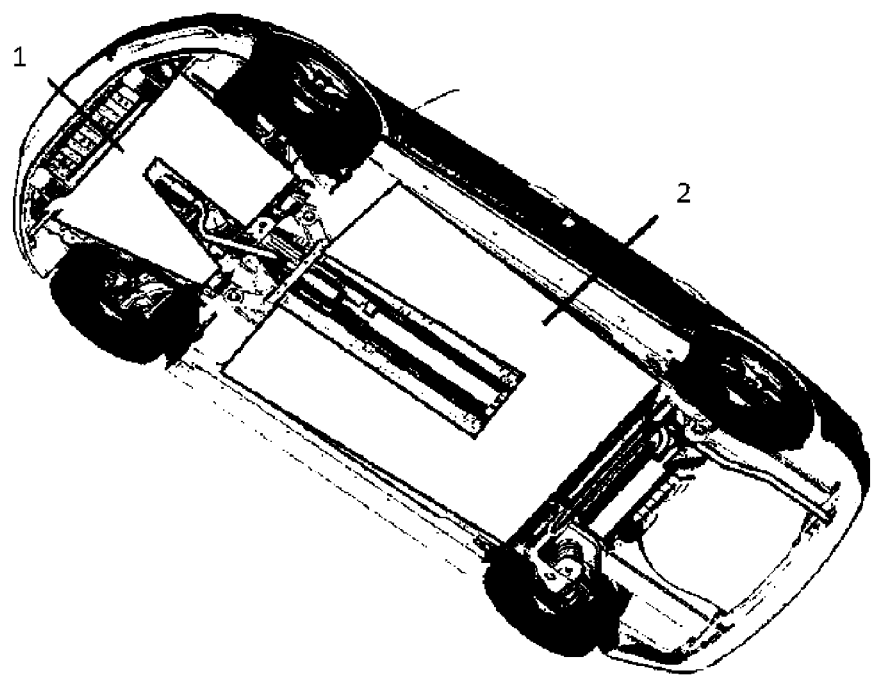
FIG. 1 shows the vehicle from underneath.
Figure 2:
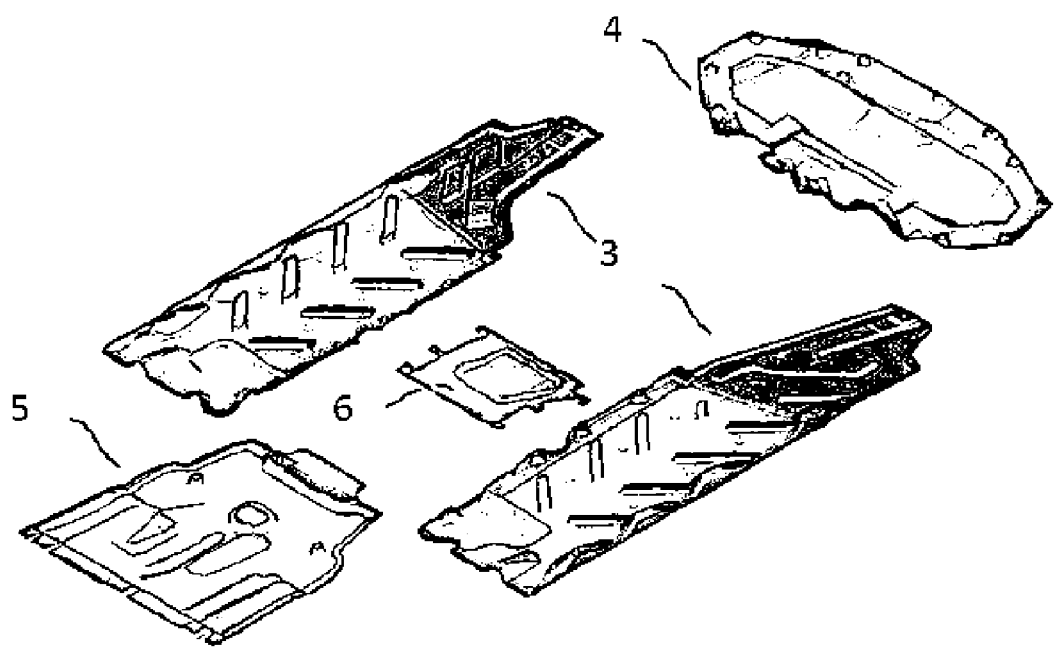
FIG. 2 shows possible exterior trim parts according to the state of the art.
Figure 3:
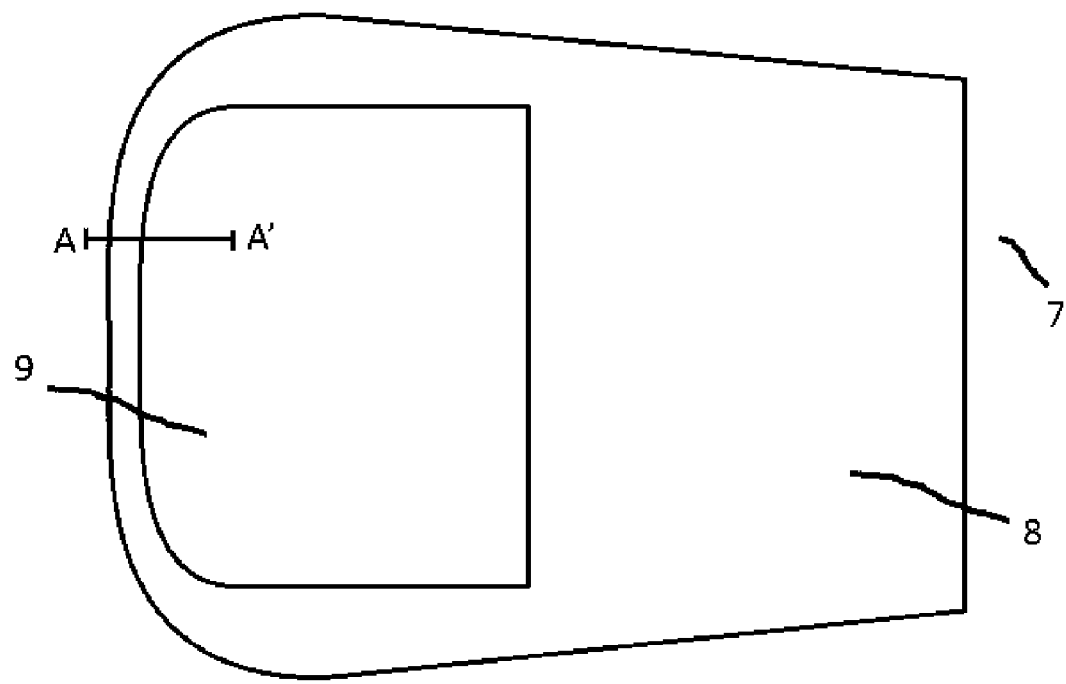
FIG. 3 shows a schematic picture of a trim part according to the invention.
Figure 4:
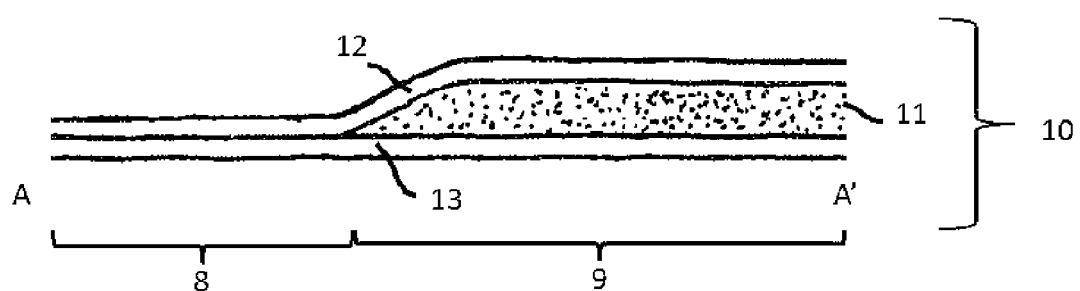
FIG. 4 shows a schematic cross section of a trim part according to the invention.

The invention claimed is:

1. An exterior structural trim part for a vehicle, comprising:
an area comprising at least three layers superposed and laminated together to form a structural unit, wherein two outer layers are compressed and consolidated fibrous layers, and wherein an inner layer situated in-between the two fibrous outer layers is an impervious foam layer consisting essentially of polyester.

2. The exterior structural trim part according to claim 1, whereby the area of the trim part not containing the structural unit comprises at least one of the outer fibrous layers compressed and consolidated.

3. The exterior structural trim part according to claim 1, whereby the consolidated fibrous layer is comprised of filler fibers and a binder in the form of thermoplastic binder, whereby the binder forms binding points between the filler fibers to consolidate the fibrous material.

4. The exterior trim part according to claim 3, whereby the filler fibers are thermoplastic fibers.

5. The exterior trim part according to claim 3, whereby the thermoplastic binder is either a copolymer of polyester or a polyamide.

6. The exterior trim part according to claim 3, whereby the filler fibers and the binder are combined in a bicomponent fiber or conjugate fiber with a core component consisting of polyester and a binder component consisting of a copolymer of polyester.

7. The exterior trim part according to claim 3, whereby the filler fibers are staple fibers or endless filaments.

8. The exterior structural trim part according to claim 1, whereby the impervious foam layer has an approximate thickness of 2 mm to 15 mm.

9. The exterior structural trim part according to claim 1, whereby at least one of the compressed and consolidated fibrous layers in the area of the structural unit has an approximate thickness of 0.5 mm to 3 mm.

10. The exterior structural trim part according to claim 1, whereby at least one of the fibrous layers has an area weight of 200 $g \cdot m^{-2}$ to 1500 $g \cdot m^{-2}$.

11. The exterior structural trim part according to claim 1, whereby the impervious foam layer is thermoplastic polyester foam made of a foam-able grade of semi crystalline polyethylene terephthalate (PET).

12. The exterior structural trim part according to claim 1, whereby the impervious foam layer is closed cell foam.

13. The exterior structural trim part according to claim 1, further comprising an adhesive layer between the fibrous layer and the impervious foam layer.

14. The exterior structural trim part according to claim 1, further comprising at least one of a film layer, a nonwoven scrim layer, a heat radiating layer, a metal film, or a heat radiating coating layer, superposed and laminated to the outer surface of at least one of the outer consolidated fibrous layers.

15. An under body or engine bay trim part comprising the exterior structural trim part according to claim 1.

16. The exterior trim part according to claim 5, wherein the copolymer of polyamide is at least one of polyamide-6 or polyamide-66.

17. The exterior trim part according to claim 3, wherein the filler fibers are polyester staple fibers and the binder comprises co-polyester binder fibers, or bicomponent staple fibers, or conjugate staple fibers.

18. The exterior structural trim part according to claim 1, wherein the compression modulus of the impervious foam layer is at least about 30 MPa.

19. The exterior structural trim part according to claim 1, wherein the impervious foam layer has a bending modulus of 200-300 MPa.

20. The exterior structural trim part according to claim 1, wherein the impervious foam layer has a density of 60-200 $kg \cdot m^{-3}$.

* * * * *